(12) United States Patent
Oh et al.

(10) Patent No.: US 11,075,587 B2
(45) Date of Patent: Jul. 27, 2021

(54) MODULAR MULTILEVEL CONVERTER AND SUB-MODULE THEREOF

(71) Applicant: HYOSUNG HEAVY INDUSTRIES CORPORATION, Seoul (KR)

(72) Inventors: Sung Min Oh, Seoul (KR); Jung Won Hong, Bucheon-si (KR); Jun Chol Lee, Gunpo-si (KR); Hong Ju Jung, Seoul (KR); Joo Yeon Lee, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 49 days.

(21) Appl. No.: 16/618,301

(22) PCT Filed: May 28, 2018

(86) PCT No.: PCT/KR2018/006018
§ 371 (c)(1),
(2) Date: Nov. 29, 2019

(87) PCT Pub. No.: WO2018/221906
PCT Pub. Date: Dec. 6, 2018

(65) Prior Publication Data
US 2021/0152099 A1    May 20, 2021

(30) Foreign Application Priority Data

Jun. 2, 2017  (KR) ........................ 10-2017-0069209

(51) Int. Cl.
*H02M 7/483*  (2007.01)
*H02M 7/537*  (2006.01)
*H02J 3/36*  (2006.01)

(52) U.S. Cl.
CPC ............... *H02M 7/483* (2013.01); *H02J 3/36* (2013.01); *H02M 7/537* (2013.01); *H02M 2007/4835* (2013.01)

(58) Field of Classification Search
CPC ................ H02M 7/483; H02M 7/537; H02M 2007/4835; H02J 3/36
See application file for complete search history.

(56) References Cited

U.S. PATENT DOCUMENTS 9,871,437 B2 *  1/2018  Hur ...................... H02M 7/483
10,148,083 B2 * 12/2018 Xie ..................... H02H 7/1203
(Continued)

FOREIGN PATENT DOCUMENTS

CN      103337951 A    10/2013
JP      2015-208211 A  11/2015
(Continued)

*Primary Examiner* — Yusef A Ahmed
(74) *Attorney, Agent, or Firm* — Novick, Kim & Lee, PLLC; Jae Yoon Kim

(57) ABSTRACT

An MMC converter linked to a HVDC system and a sub-module constituting the MMC converter are proposed. The sub-module includes: first and second power semiconductor switches connected in series in the same direction, each including a semiconductor switch and a diode connected in anti-parallel to the semiconductor switch; a capacitor connected in parallel to the first and second power semiconductor switches connected together in series; a first terminal connected to a first node between the first and second power semiconductor switches; a second terminal connected to a second node between the second power semiconductor switch and the capacitor; third and fourth power semiconductor switches connected in series in opposite directions between the first and second terminals, each including a semiconductor switch and a diode connected in anti-parallel to the semiconductor switch; and a third terminal connected to a third node between the third and fourth power semiconductor switches.

26 Claims, 9 Drawing Sheets

(56) References Cited

U.S. PATENT DOCUMENTS

| | | | |
|---|---|---|---|
| 10,256,745 B2* | 4/2019 | Nami | H02M 1/32 |
| 10,523,131 B2* | 12/2019 | Li | H02M 7/493 |
| 2014/0203632 A1* | 7/2014 | Kouno | H02M 1/32 |
| | | | 307/9.1 |
| 2015/0124506 A1* | 5/2015 | Sahoo | H02M 5/225 |
| | | | 363/126 |
| 2015/0357906 A1* | 12/2015 | Jung | H02M 1/00 |
| | | | 363/56.03 |
| 2016/0043659 A1* | 2/2016 | Xu | H02M 1/088 |
| | | | 363/131 |
| 2016/0094117 A1* | 3/2016 | Hu | H02M 1/32 |
| | | | 363/51 |
| 2016/0218637 A1* | 7/2016 | Fan | H02M 7/44 |
| 2016/0268915 A1* | 9/2016 | Lin | H02M 7/483 |
| 2017/0012521 A1* | 1/2017 | Jimichi | H02M 1/38 |
| 2017/0012554 A1* | 1/2017 | Pu | H02M 7/155 |
| 2018/0006551 A1* | 1/2018 | Park | H02M 7/19 |
| 2018/0136281 A1* | 5/2018 | Chung | H02J 3/18 |
| 2018/0138826 A1* | 5/2018 | Jimichi | H02M 1/32 |
| 2019/0131867 A1* | 5/2019 | Ishii | H02M 7/48 |
| 2019/0356217 A1* | 11/2019 | Kim | H02M 1/32 |
| 2020/0007028 A1* | 1/2020 | Hong | H02M 7/483 |
| 2020/0119559 A1* | 4/2020 | Hong | H02M 1/32 |
| 2020/0177097 A1* | 6/2020 | Takahashi | H02M 7/483 |
| 2020/0201953 A1* | 6/2020 | Shi | G06F 30/367 |
| 2020/0366186 A1* | 11/2020 | Hur | H02M 7/483 |

FOREIGN PATENT DOCUMENTS

| | | | |
|---|---|---|---|
| KR | 10-2016-0060725 A | 5/2016 | |
| KR | 10-2016-0060829 A | 5/2016 | |
| KR | 10-2016-0109366 A | 9/2016 | |

* cited by examiner

MODULAR MULTILEVEL CONVERTER AND SUB-MODULE THEREOF

TECHNICAL FIELD

The present invention relates to a modular multilevel converter (MMC) and, more particularly, to a MMC converter and sub-module thereof constituting the same linked to a high voltage direct current (HVDC) system.

BACKGROUND ART

A high voltage direct current (HVDC) system converts AC power produced in power plants into DC power and transmits the power to receiving ends where the power is converted again into AC power to supply to a load. The HVDC system is capable of efficient and economical power transmission through voltage boosting, and has advantages such as enabling connection of heterogeneous systems and long-distance, high-efficiency power transmission.

This HVDC system may be linked to MMC converters. The conventional MMC converter is composed of one or more phase modules 1 as shown in FIGS. 1a and 1b. Each of these phase modules 1 is composed of a plurality of sub-modules 2 connected in series to each other. Each phase module 1 is connected to terminals L1, L2, and L3 for connecting to an AC system. The upper and lower converter arms 1a and 1b are classified on the basis of each terminal L1, L2, and L3. The second terminal X2 of the lowermost sub-module of the upper converter arm 1a and the first terminal X1 of the uppermost sub-module of the lower converter arm 1b may be connected to any one of the terminals L1, L2, and L3 of the AC grid system. For example, the AC grid system may be a three-phase AC power system.

The conventional sub-module 2 is configured to be a full-bridge circuit composed of a pair of power semiconductor switches 21 connected in series to each other and a capacitor 22 connected in parallel thereto, or a half-bridge circuit composed of a pair of power semiconductor switches 21 connected in series to each other and a capacitor 22 connected in parallel thereto, as shown in FIG. 2. Two terminals X1 and X2 are provided in each of the sub-modules 2 so that the upper and lower sub-modules are connected to each other in series through the two terminals X1 and X2.

In the conventional MMC converter, the sub-module 2 constituting the upper converter arm 1a and the lower converter arm 1b is provided with at least one redundant sub-module 2a having the same form as the sub-module 2, for redundancy operation of the sub-module 2. The redundant sub-module 2a is to replace a sub-module in which a failure occurs among a plurality of sub-modules 2 in operation, and is input and operated instead of the sub-module in which the failure occurs.

However, since the redundant sub-module 2a of the related art may not be commonly applied to the upper converter arm 1a and the lower converter arm 1b, there is a problem in that separate redundant sub-modules are needed to be respectively provided in the upper converter arm 1a and the lower converter arm 1b, thereby causing the inconvenience and increasing the cost.

DISCLOSURE

Technical Problem

Accordingly, an objective of the present invention is to provide a MMC converter including a sub-module commonly applicable to an upper converter arm and a lower converter arm in the MMC converter and the sub-module thereof.

Technical Solution

In order to achieve the objective of the present invention, there is provided a sub-module of a MMC converter according to an exemplary embodiment of the present invention, the sub-module including: a first power semiconductor switch and a second power semiconductor switch connected in series in a same direction, each comprising a semiconductor switch and a diode connected in anti-parallel to the semiconductor switch; a capacitor connected in parallel to the first power semiconductor switch and the second power semiconductor switch connected in series; a first terminal connected to a first node between the first and second power semiconductor switches; a second terminal connected to a second node between the second power semiconductor switch and the capacitor; a third power semiconductor switch and a fourth power semiconductor switch connected in series in opposite directions, each including a semiconductor switch and a diode connected in anti-parallel to the semiconductor switch; and a third terminal connected to a third node between the third and fourth power semiconductor switches.

In addition, according to another exemplary embodiment of the present invention, there is provided a sub-module of a MMC converter, the sub-module including: a first power semiconductor switch and a second power semiconductor switch connected in series in a same direction, each comprising a semiconductor switch and a diode connected in anti-parallel to the semiconductor switch; a third power semiconductor switch and a fourth power semiconductor switch connected in series in a same direction, each comprising a semiconductor switch and a diode connected in anti-parallel to the semiconductor switch; a capacitor connected in parallel to the first power semiconductor switch and the second power semiconductor switch connected in series and to the third power semiconductor switch and the fourth power semiconductor switch connected in series; a first terminal connected to a first node between the first and second power semiconductor switches; a second terminal connected to a second node between the third and fourth power semiconductor switches; a fifth power semiconductor switch and a sixth power semiconductor switch connected in series in opposite directions between the first and second nodes, each including a semiconductor switch and a diode connected in anti-parallel to the semiconductor switch; and a third terminal connected to a third node between the fifth and sixth power semiconductor switches.

In addition, according to an exemplary embodiment of the present invention, there is provided a redundant sub-module of a MMC converter, the redundant sub-module including: a first power semiconductor switch and a second power semiconductor switch connected in series in a same direction, each comprising a semiconductor switch and a diode connected in anti-parallel to the semiconductor switch; a capacitor connected in parallel to the first power semiconductor switch and the second power semiconductor switch connected in series; a first terminal connected to a first node between the first and second power semiconductor switches; a second terminal connected to a second node between the second power semiconductor switch and the capacitor; a third power semiconductor switch and a fourth power semiconductor switch connected in series in opposite directions, each including a semiconductor switch and a diode connected in anti-parallel to the semiconductor switch; and a third terminal connected to a third node between the third and fourth power semiconductor switches, wherein the redundant sub-module is connected between an upper converter arm and a lower converter arm composed of a plurality of sub-modules connected in series to each other and is configured to be applicable in common to the upper converter arm and the lower converter arm constituting the MMC converter such that the redundant sub-module operates by replacing a sub-module in which a failure occurs among the plurality of sub-modules constituting the upper converter arm or the lower converter arm.

In addition, according to another exemplary embodiment of the present invention, there is provided a redundant sub-module of a MMC converter, the redundant sub-module including: a first power semiconductor switch and a second power semiconductor switch connected in series in a same direction, each comprising a semiconductor switch and a diode connected in anti-parallel to the semiconductor switch; a third power semiconductor switch and a fourth power semiconductor switch connected in series in a same direction, each comprising a semiconductor switch and a diode connected in anti-parallel to the semiconductor switch; a capacitor connected in parallel to the first power semiconductor switch and the second power semiconductor switch connected in series and to the third power semiconductor switch and the fourth power semiconductor switch connected in series; a first terminal connected to a first node between the first and second power semiconductor switches; a second terminal connected to a second node between the third and fourth power semiconductor switches; a fifth power semiconductor switch and a sixth power semiconductor switch connected in series in opposite directions between the first and second nodes, each including a semiconductor switch and a diode connected in anti-parallel to the semiconductor switch; and a third terminal connected to a third node between the fifth and sixth power semiconductor switches, wherein the redundant sub-module is connected between an upper converter arm and a lower converter arm composed of a plurality of sub-modules connected in series to each other and is configured to be applicable in common to the upper converter arm and the lower converter arm constituting the MMC converter such that the redundant sub-module operates by replacing a sub-module in which a failure occurs among the plurality of sub-modules constituting the upper converter arm or the lower converter arm.

In addition, according to an exemplary embodiment of the present invention, there is provided a MMC converter including: an upper converter arm composed of a plurality of sub-modules connected in series to each other; and a lower converter arm composed of a plurality of sub-modules connected in series to each other and connected in series to a sub-module of the upper converter arm, wherein each of the sub-modules includes: a first power semiconductor switch and a second power semiconductor switch connected in series in a same direction, each including a semiconductor switch and a diode connected in anti-parallel to the semiconductor switch; a capacitor connected in parallel to the first power semiconductor switch and the second power semiconductor switch connected in series; a first terminal connected to a first node between the first and second power semiconductor switches; a second terminal connected to a second node between the second power semiconductor switch and the capacitor; a third power semiconductor switch and a fourth power semiconductor switch connected in series in opposite directions between the first terminal and the second terminal, each including a semiconductor switch and a diode connected in anti-parallel to the semiconductor switch; and a third terminal connected to a third node between the third and fourth power semiconductor switches.

In addition, according to another exemplary embodiment of the present invention, there is provided a MMC converter including: an upper converter arm composed of a plurality of sub-modules connected in series to each other; and a lower converter arm composed of a plurality of sub-modules connected in series to each other and connected in series to a sub-module of the upper converter arm, wherein each of the sub-modules includes: a first power semiconductor switch and a second power semiconductor switch connected in series in a same direction, each including a semiconductor switch and a diode connected in anti-parallel to the semiconductor switch; a third power semiconductor switch and a fourth power semiconductor switch connected in series in a same direction, each including a semiconductor switch and a diode connected in anti-parallel to the semiconductor switch; a capacitor connected in parallel to the first and second power semiconductor switches connected in series and to the third and fourth power semiconductor switches connected in series; a first terminal connected to a first node between the first and second power semiconductor switches; a second terminal connected to a second node between the third and fourth power semiconductor switches; a fifth power semiconductor switch and a sixth power semiconductor switch connected in series in opposite directions between the first and second nodes, each including a semiconductor switch and a diode connected in anti-parallel to the semiconductor switch; and a third terminal connected to a third node between the fifth and sixth power semiconductor switches.

In addition, according to yet another exemplary embodiment of the present invention, there is provided a MMC converter including: an upper converter arm composed of a plurality of sub-modules connected in series to each other; a lower converter arm composed of a plurality of sub-modules connected in series to each other; and at least one redundant sub-module connected in series between the upper and lower converter arms and commonly applicable to the upper and lower converter arms, wherein the redundant sub-module includes: a first power semiconductor switch and a second power semiconductor switch connected in series in a same direction, each including a semiconductor switch and a diode connected in anti-parallel to the semiconductor switch; a capacitor connected in parallel to the first power semiconductor switch and the second power semiconductor switch connected in series; a first terminal connected to a first node between the first and second power semiconductor switches; a second terminal connected to a second node between the second power semiconductor switch and the capacitor; a third power semiconductor switch and a fourth power semiconductor switch connected in series in opposite directions between the first terminal and the second terminal, each including a semiconductor switch and a diode connected in anti-parallel to the semiconductor switch; and a third terminal connected to a third node between the third and fourth power semiconductor switches.

In addition, according to still another exemplary embodiment of the present invention, there is provided a MMC converter including: an upper converter arm composed of a plurality of sub-modules connected in series to each other; a lower converter arm composed of a plurality of sub-modules connected in series to each other; and at least one redundant sub-module connected in series between the upper and lower converter arms and commonly applicable to the upper and lower converter arms, wherein the redundant sub-module comprises: a first power semiconductor switch and a second power semiconductor switch connected in series in a same direction, each including a semiconductor switch and a diode connected in anti-parallel to the semiconductor switch; a third power semiconductor switch and a fourth power semiconductor switch connected in series in a same direction, each including a semiconductor switch and a diode connected in anti-parallel to the semiconductor switch; a capacitor connected in parallel to the first and second power semiconductor switches connected in series and to the third and fourth power semiconductor switches connected in series; a first terminal connected to a first node between the first and second power semiconductor switches; a second terminal connected to a second node between the third and fourth power semiconductor switches; a fifth power semiconductor switch and a sixth power semiconductor switch connected in series in opposite directions between the first and second nodes, each including a semiconductor switch and a diode connected in anti-parallel to the semiconductor switch; and a third terminal connected to a third node between the fifth and sixth power semiconductor switches.

Advantageous Effects

In a MMC converter, at least two redundant sub-modules were applied to the upper and lower converter arms in the related art. However, according to the present invention, one redundant sub-module may be commonly applied to the upper and lower converter arms, thereby simplifying the structure of the circuit and reducing the cost and improving the reliability of the MMC converter.

MODE FOR INVENTION

Figure 1A:
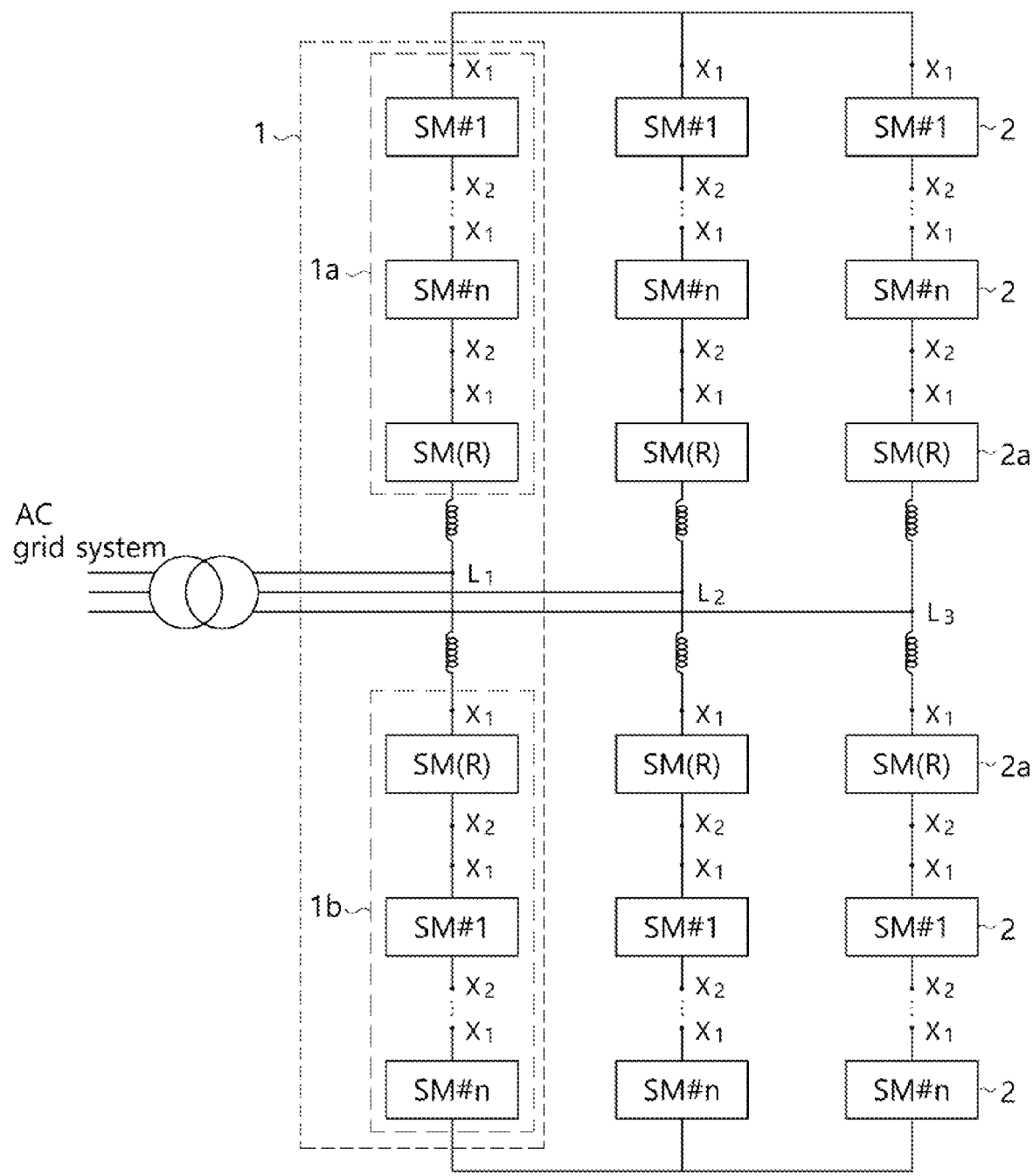
FIGS. 1a and 1b are circuit diagrams of a conventional MMC converter.
Figure 1B:
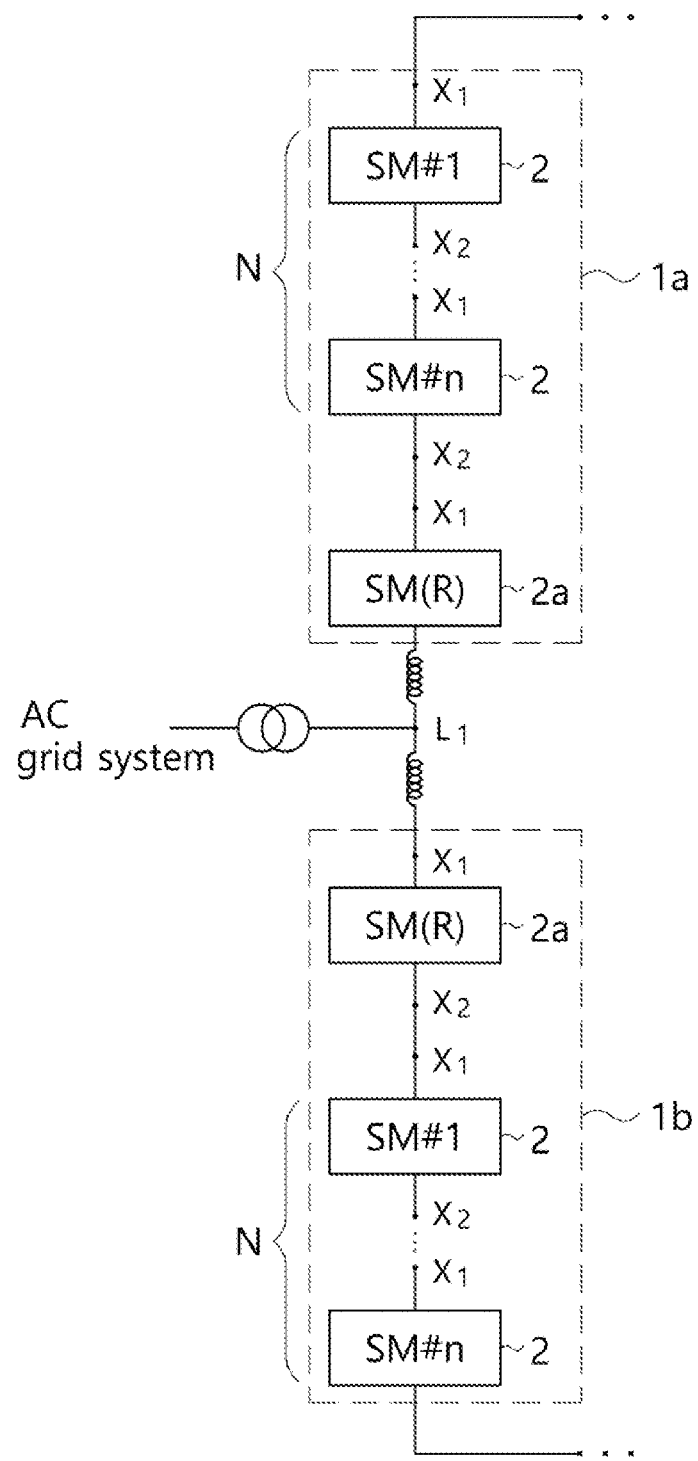
Figure 2A:
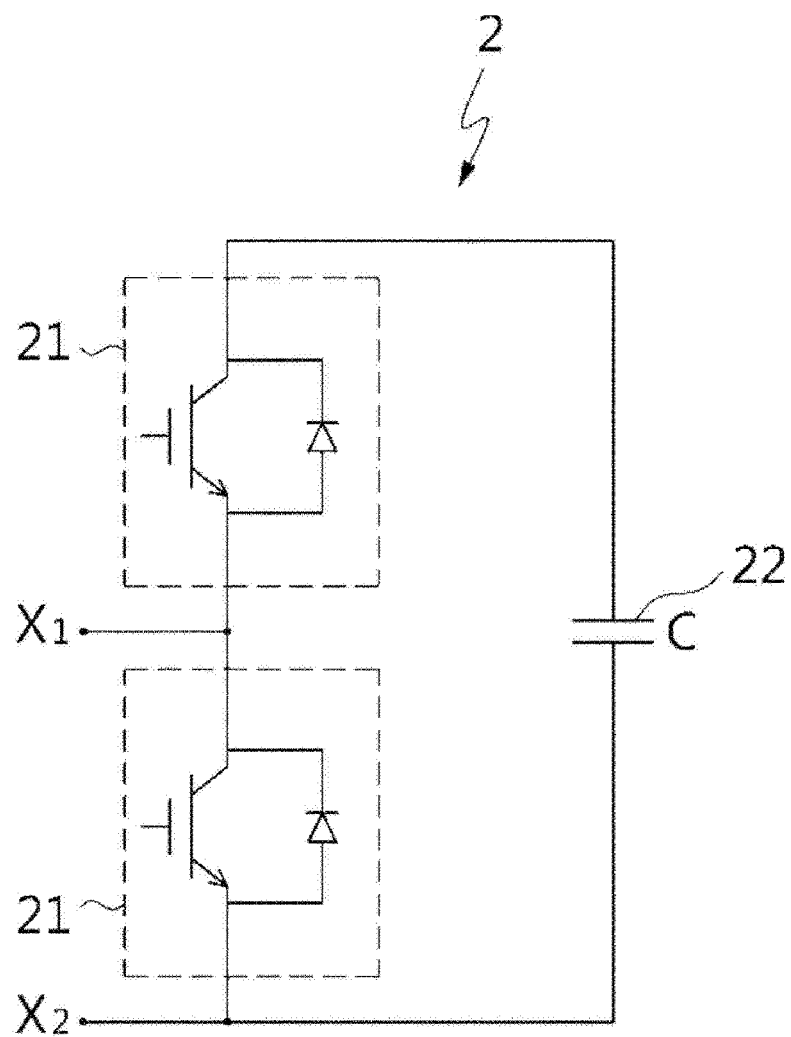
FIG. 2a and FIG. 2b are configuration diagrams of a sub-module applied to the conventional MMC converter.
Figure 2B:
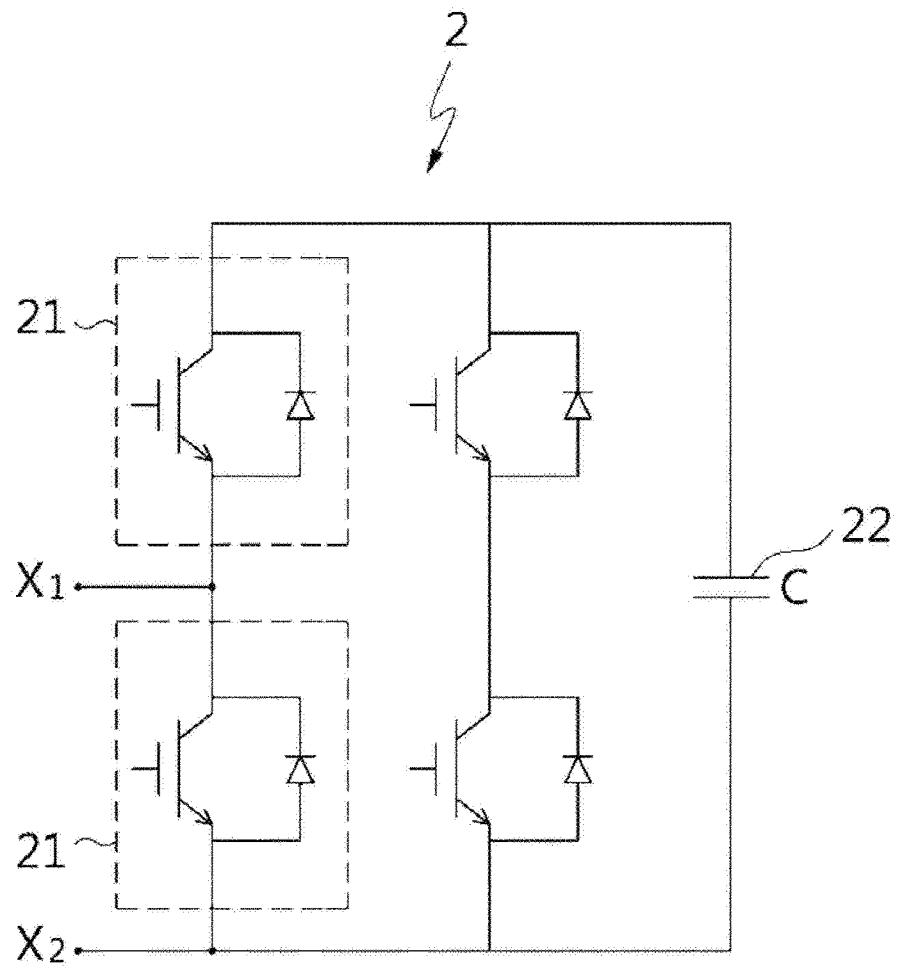

Hereinafter, an exemplary embodiment of the present invention is described in detail with reference to the accompanying drawings. In adding reference numerals to the components of each drawing, it should be noted that the same reference numerals are used to refer to the same components as much as possible even if displayed on different drawings. Further, in the following description, if it is decided that the detailed description of a known function or configuration related to the invention makes the subject matter of the invention unclear, the detailed description is omitted.

Further, when describing the components of the present invention, terms such as first, second, A, B, (a) or (b) may be used. Since these terms are provided merely for the purpose of distinguishing the components from each other, they do not limit the nature, sequence, or order of the components. If a component is described as being "connected", "coupled", or "linked" to another component, that component may be directly connected or connected to that other component, however it should be understood that yet another component between each of the components may be "connected", "coupled", or "linked" to each other.

Figure 3:
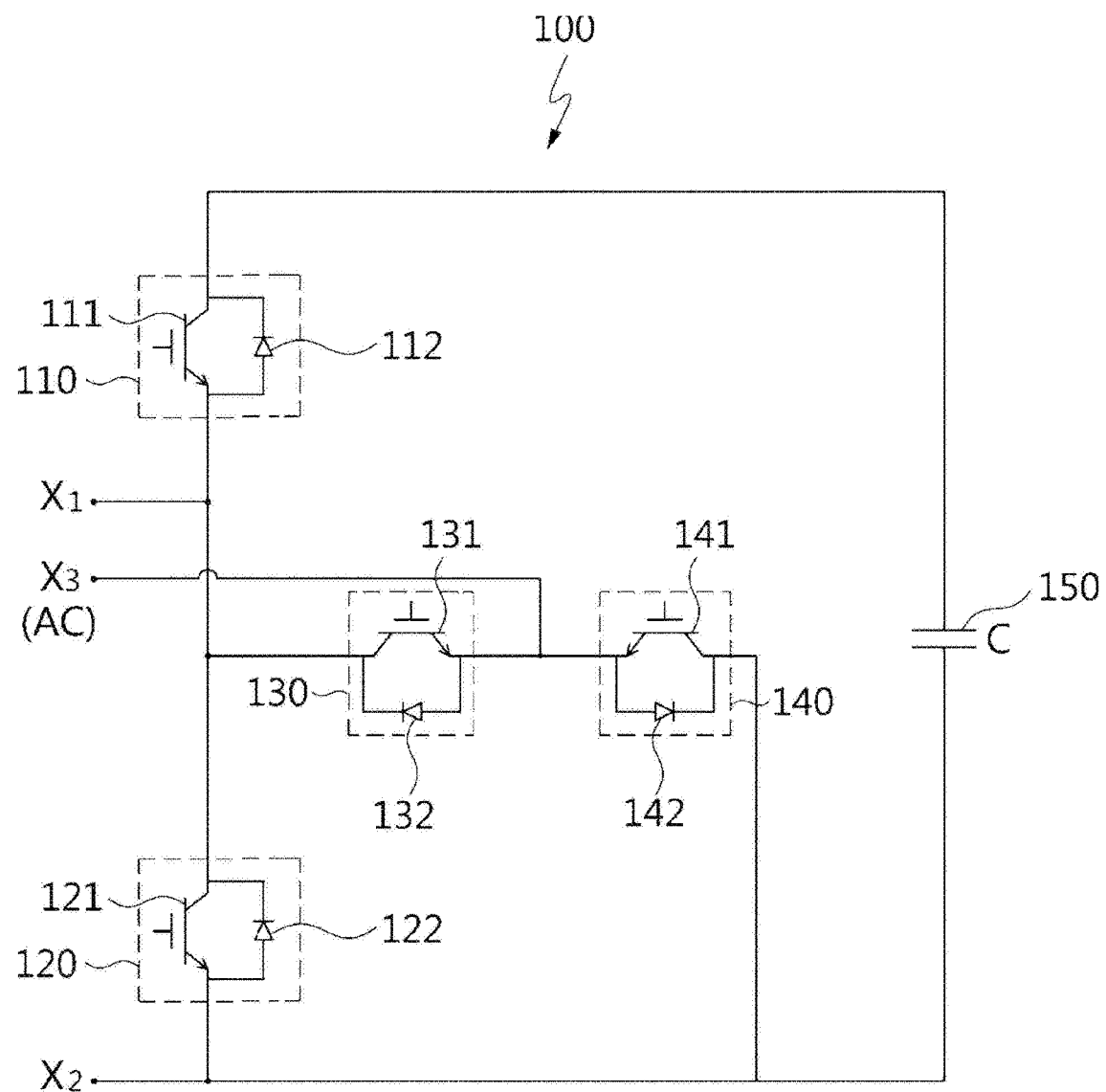
FIG. 3 is the configuration diagram of the sub-module according to the first exemplary embodiment of the present invention.

FIG. 3 is the configuration diagram of the sub-module according to the first exemplary embodiment of the present invention.

Referring to FIG. 3, a sub-module 100 according to the first exemplary embodiment of the present invention may include a first power semiconductor switch 110, a second power semiconductor switch 120, and a third power semiconductor switch 130, a fourth power semiconductor switch 140, and a capacitor 150.

The first power semiconductor switch 110 includes a first semiconductor switch 111 and a first diode 112 connected in anti-parallel to the first semiconductor switch 111, and the second power semiconductor switch 120 includes a second semiconductor switch 121 and a second diode 122 connected in anti-parallel to the second semiconductor switch 121. Here, the first power semiconductor switch 110 and the second power semiconductor switch 120 are connected in series in the same direction.

The capacitor 150 is connected in parallel to the first and second power semiconductor switches 110 and 120 connected in series to each other as described above.

The third power semiconductor switch 130 includes a third semiconductor switch 131 and a third diode 132 connected in anti-parallel to the third semiconductor switch 131, and the fourth power semiconductor switch 140 includes a fourth semiconductor switch 141 and a fourth diode 142 connected in anti-parallel to the fourth semiconductor switch 141. Here, the third power semiconductor switch 130 and the fourth power semiconductor switch 140 are connected in series in the opposite directions. In particular, a cathode of the third diode 132 included in the third power semiconductor switch 130 is connected to a first node N1, and a cathode of the fourth diode 142 included in the fourth power semiconductor switch 140 is connected to a second node N2.

In the sub-module 100, a first terminal X1 is connected to the first node N1 between the first and second power semiconductor switches 110 and 120, and the second terminal X2 is connected to the second node N2 between the second power semiconductor switch 120 and a capacitor 150, and a third terminal X3 is connected to the third node N3 between the third and fourth power semiconductor switches 130 and 140. In this case, the third terminal X3 is a terminal connected to the AC grid system and is connected to an input and output terminal of the AC grid system. These first to third nodes N1 to N3 are points where branch lines for connecting respective terminals are connected to connection lines between the corresponding components.

Here, the sub-module 100 may be used as a plurality of sub-modules constituting the upper and lower converter arms 11a and 11b in the MMC converter. Also, the sub-modules 100 may be used as a redundant sub-module input when a failure occurs in these sub-modules. When used as a redundant sub-module, the sub-module is connected between the upper converter arm 11a and the lower converter arm 11b in the MMC converter and replaces a failed sub-module among the plurality of sub-modules 12a and 12b comprising the upper converter arm 11a or the lower converter arm 11b so as to operate as a normal sub-module in the MMC converter.

The first terminal X1 and the second terminal X2 are connected to terminals of other normal sub-modules, and the third terminal X3 is connected to a terminal of the AC grid system. When applied as a redundant sub-module 100, the sub-module is connected in series with another sub-module in either the converter arm of the upper converter arm 11a or the lower converter arm 11b. In this case, the first terminal X1 is connected to one of two terminals of the lowermost sub-module 12a-n of the upper converter arm 11a, and the second terminal X2 is connected to one of the two terminals of the uppermost sub-module 12b-1 of the lower converter arm 11b. The third terminal X3 is connected to a terminal of the AC grid system.

As described above, each sub-module 100 shown in FIG. 3 is provided with the first and second terminals X1 and X2 for connecting in series with other sub-modules at the upper and lower converter arms, and at the same time, includes a third terminal X3 for connecting to the AC grid system. Thus, the sub-module 100 is directly connected to the AC grid system when used as a sub-module in the upper and lower converter arms 11a and 11b as well as when used as a redundant sub-module.

Figure 4:
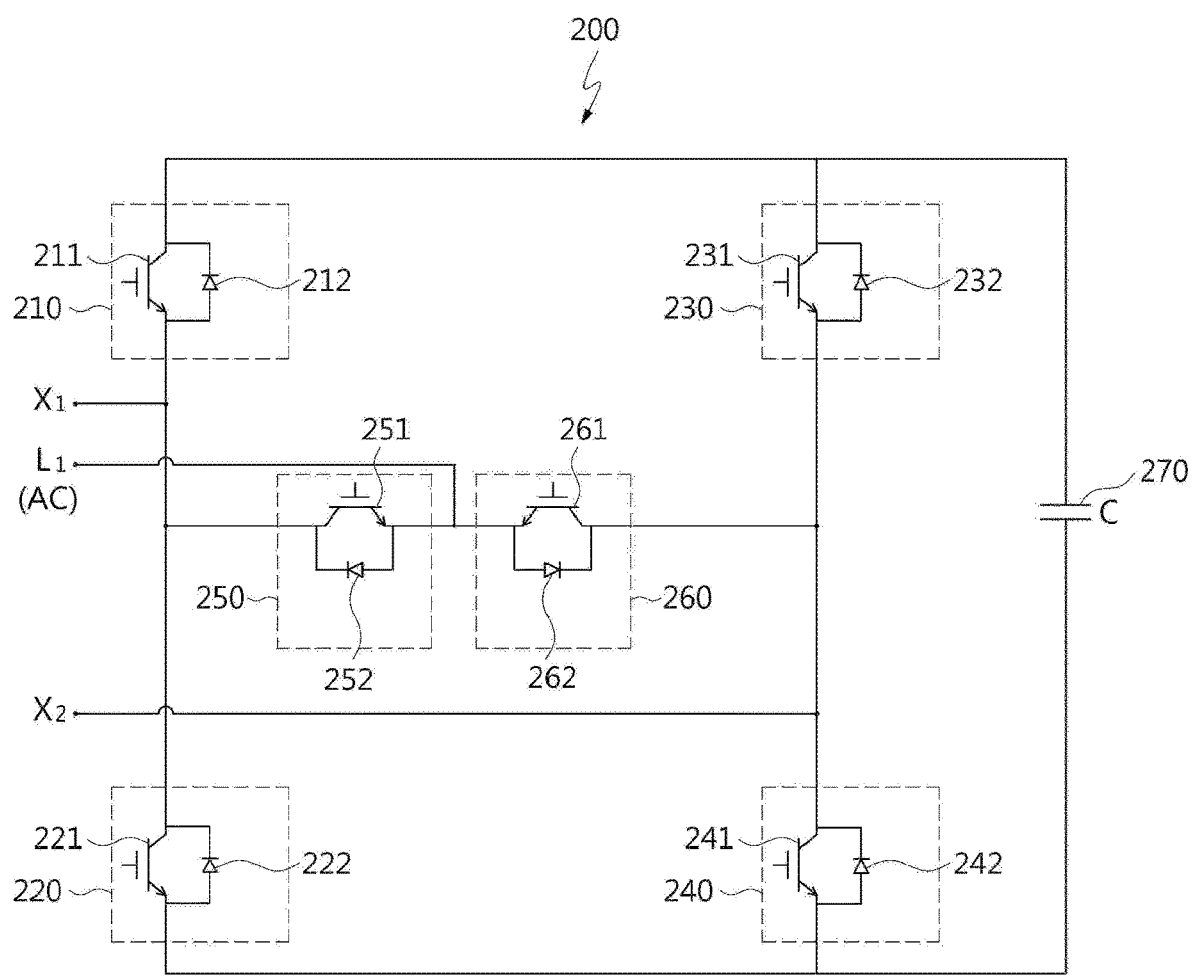
FIG. 4 is a configuration diagram of a sub-module according to a second exemplary embodiment of the present invention.

FIG. 4 is a configuration diagram of a sub-module according to a second exemplary embodiment of the present invention.

Referring to FIG. 4, a sub-module 200 according to the second exemplary embodiment of the present invention may include a first power semiconductor switch 210, a second power semiconductor switch 220, and a third power semiconductor switch 230, a fourth power semiconductor switch 240, a fifth power semiconductor switch 250, a sixth power semiconductor switch 260, and a capacitor 270.

The first power semiconductor switch 210 includes a first semiconductor switch 211 and a first diode 212 connected in anti-parallel to the first semiconductor switch 211, and the second power semiconductor switch 220 includes a second semiconductor switch 221 and a second diode 222 connected in anti-parallel to the second semiconductor switch 221. The first power semiconductor switch 210 and the second power semiconductor switch 220 are connected in series in the same direction.

The third power semiconductor switch 230 includes a third semiconductor switch 231 and a third diode 232 connected in anti-parallel to the third semiconductor switch 231, and the fourth power semiconductor switch 240 includes a fourth semiconductor switch 241 and a fourth diode 242 connected in anti-parallel to the fourth semiconductor switch 241. The third power semiconductor switch 230 and the fourth power semiconductor switch 240 are connected in series in the same direction.

The capacitor 270 is connected in parallel to the first and second power semiconductor switches 210 and 220 connected in series to each other and to the third and fourth power semiconductor switches 230 and 240 connected in series to each other.

In this case of the sub-module 200, the first terminal X1 is connected to the first node N1 between the first and second power semiconductor switches 210 and 220, and the second terminal X2 is connected to the second node N2 between the third and fourth power semiconductor switches 230 and 240.

The fifth power semiconductor switch 250 includes a fifth semiconductor switch 251 and a fifth diode 252 connected in anti-parallel to the fifth semiconductor switch 251, and the sixth power semiconductor switch 260 includes a sixth semiconductor switch 261 and a sixth diode 262 connected in anti-parallel to the sixth semiconductor switch 261. The fifth power semiconductor switch 250 and the sixth power semiconductor switch 260 are connected in series in the opposite directions. In particular, the cathode of the fifth diode 252 included in the fifth power semiconductor switch 250 is connected to the first node N1 and the cathode of the sixth diode 262 included in the sixth power semiconductor switch 260 is connected to the second node N2. In this case, the fifth and sixth power semiconductor switches 250 and 260 connected in series to each other are connected between the first node N1 and the second node N2.

In addition, the third terminal X3 is connected to the third node N3 between the fifth and sixth power semiconductor switches 250 and 260. In this case, the third terminal X3 is a terminal connected to the AC grid system and is connected to an input and output terminal of the AC grid system. These first to third nodes N1 to N3 are points where branch lines for connecting respective terminals are connected to connection lines between the corresponding components.

As described above, each sub-module 200 shown in FIG. 4 is provided with the first and second terminals X1 and X2 for connecting in series with other sub-modules at the upper and lower converter arms as same as the sub-module 100 shown in FIG. 3, and at the same time, includes the third terminal X3 for connecting to the AC grid system. Thus, the sub-module 200 is directly connected to the AC grid system when used as a sub-module in the upper and lower converter arms 11a and 11b as well as when used as a redundant sub-module.

Figure 5:
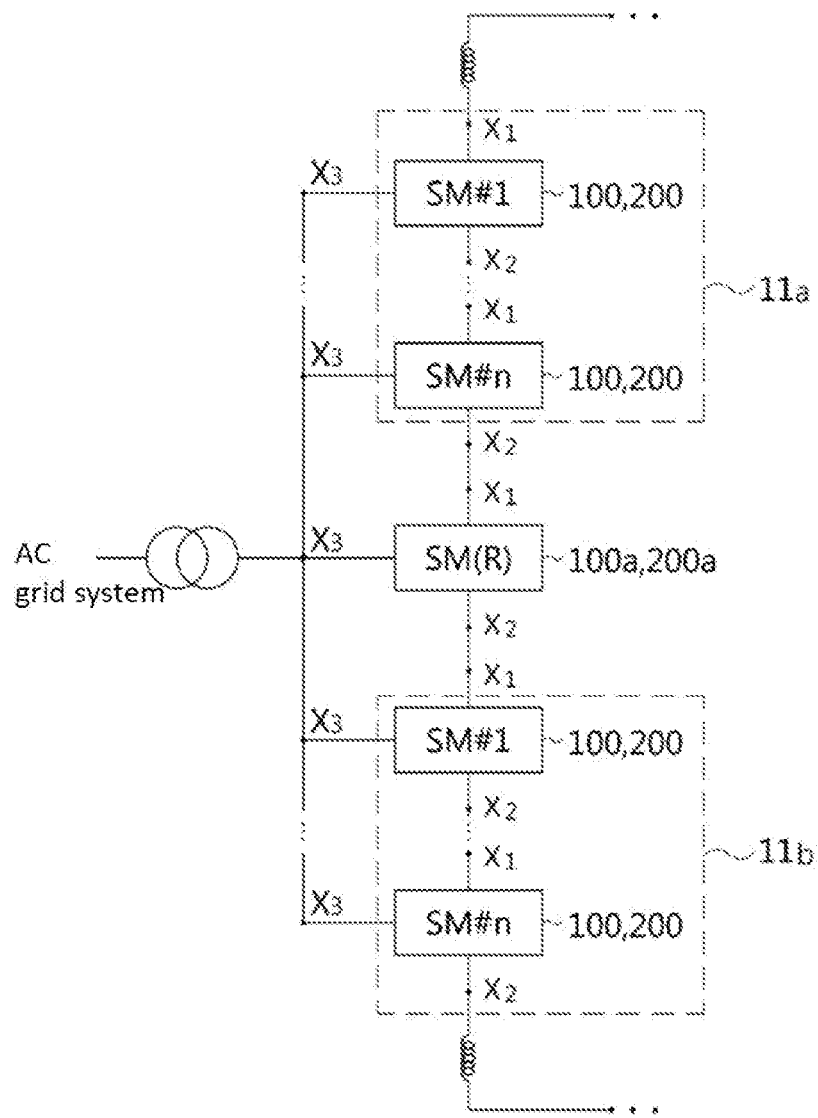
FIG. 5 is a circuit diagram of a MMC converter to which a sub-module is applied according to an exemplary embodiment of the present invention.

FIG. 5 is a circuit diagram of a MMC converter to which a sub-module is applied according to the present invention.

Referring to FIG. 5, the MMC converter to which the sub-modules 100 and 200 are applied according to the present invention includes N sub-modules 100 and 200 and at least one redundant sub-module 100a and 200a. Here, the N sub-modules 100 and 200 and the redundant sub-modules 100a and 200a are given different reference numerals for convenience of description, but actually have the same configurations as shown in FIGS. 3 and 4. The redundant sub-modules 100a and 200a are input and operated by replacing the sub-modules in which the failure occurs when a failure occurs in any of the N sub-modules 100 and 200.

Although one redundant sub-module 100a or 200a is exemplarily illustrated in the drawing, this is an example, and the redundant sub-module 100a and 200a may be provided with at least one or more. In particular, unlike the related art having a redundant sub-module 2a in the upper converter arm 1a and the lower converter arm 1b, respectively, the present invention is provided with the redundant sub-modules 100a and 200a that may be used in common to the upper converter arm 11a and the lower converter arm 11b.

For example, in the related art, two redundant sub-modules 2a are provided, one for each of the upper and lower converter arms 1a and 1b, but the present invention includes only one sub-module 100a or 200a which may be commonly used for the upper and lower converter arms 11a and 11b so that when a failure occurs in any one of the sub-modules of the upper or lower converter arms 11a or 11b, the failed sub-module may be replaced with the upper or lower converter arms 11a or 11b. As a result, the number of redundant sub-modules may be reduced compared to the related art, thereby having an effect in terms of cost saving. In the present invention, the number of redundant sub-modules will be selectively determined according to the characteristics of the MMC converter and the number of sub-modules of the converter arm.

In addition, as may be seen in FIG. 5, each of the sub-modules 100, 200, 100a, and 200a in the MMC converter according to the exemplary embodiment of the present invention has a feature that is directly connected to the AC grid system through the third terminal X3.

Figures 6A, 6B:
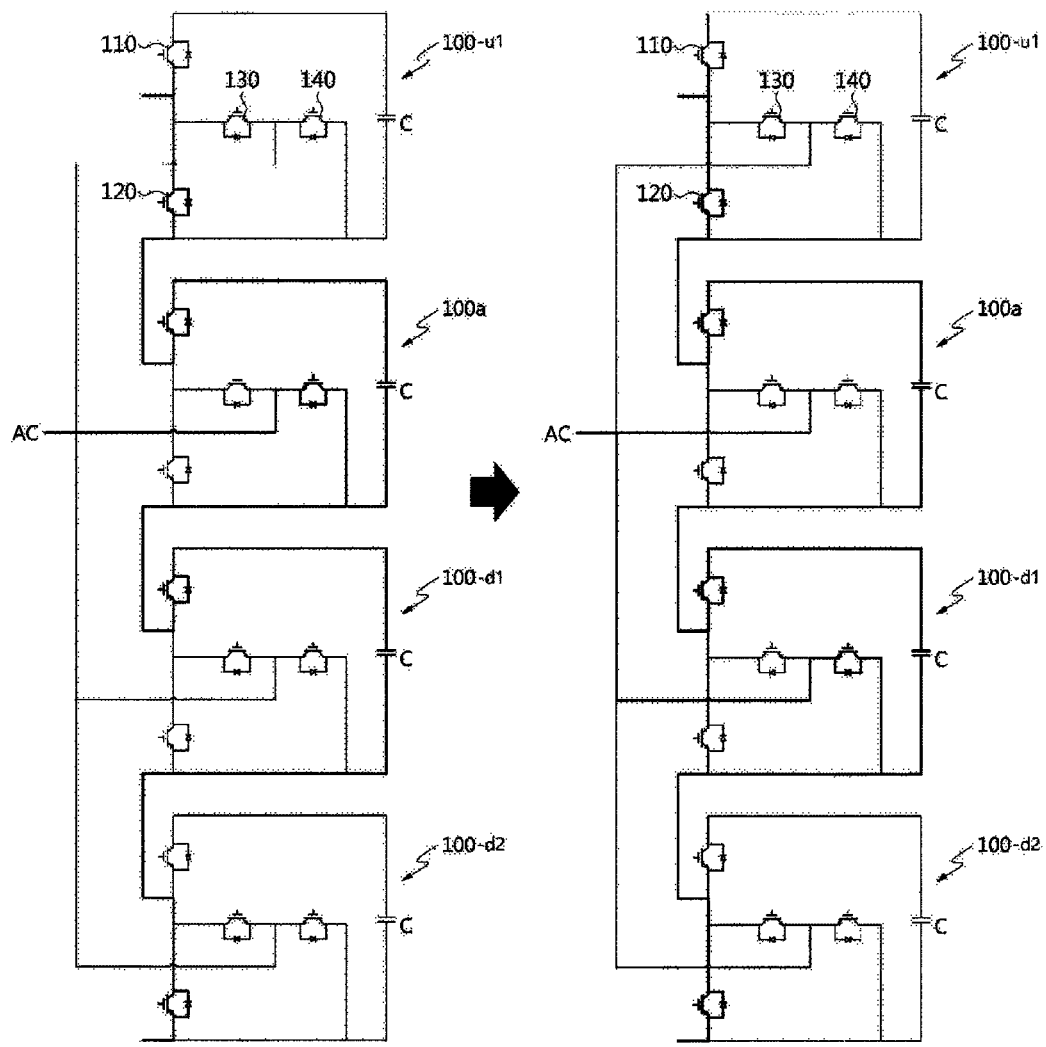
FIG. 6a and FIG. 6b are operation diagrams illustrating an example of the MMC converter to which the sub-module of FIG. 3 is applied.

FIG. 6a and FIG. 6b are operation diagrams illustrating an example of the MMC converter to which the sub-module of FIG. 3 is applied.

In FIG. 6a and FIG. 6b, for example, the sub-modules 100-u1 of the upper converter arm 11a and the lower converter arm 11b are provided with the sub-modules 100-d1 and 100-d2, and the current flow is illustrated according to the operation in the MMC converter to which the redundant sub-module 100a is connected between the upper and lower converter arms 11a and 11b.

First, in a view of FIG. 6a, an example is illustrated in which a sub-module 100-u1 having a failure is replaced with the redundant sub-module 100a when the current is bypassed due to a failure in the sub-module 100-u1 of the upper converter arm 11a during each of the sub-modules 100-u1, 100-d1, 100-d2 is in normal operation in the upper converter arm 11a and the lower converter arm 11b.

The failed sub-module 100-u1 turns on the second power semiconductor switch 120 and turns off the first, third, and fourth power semiconductor switches 110, 130, and 140 to bypass the current, so that the current supplied from the upper sub-module (not shown) through the first terminal X1 is to flow to the second terminal X2 through the second power semiconductor switch 120 so as to supply the current to the redundant sub-module 100a.

The redundant sub-module 100a replaces the failed sub-module 100-u2, and for this purpose, the first and fourth power semiconductor switches 110 and 140 are turned on and the second and third power semiconductor switches 120 and 130 are turned off. As a result, the redundant sub-module 100a operates as a sub-module of the upper converter arm 11a, and the current bypassed from the sub-module 100-u1 having a failure as described above is supplied through the first terminal X1. Accordingly, the current flows to the second terminal X2 through the first power semiconductor switch 110 and the capacitor 140, and the current is supplied to the AC grid system as the fourth power semiconductor switch 140 is turned on.

The redundant sub-module 100a may be input by substituting the failed sub-module in the same principle as described above, depending on the number of redundant sub-modules 100a provided.

Here, as shown in the diagram, when additional failure occurs in another sub-module of the upper converter arm 11a while all the redundant sub-modules 100a are input, any one of the plurality of sub-modules constituting the lower converter arm 11b may be operated as a sub-module of the upper converter arm 11a as shown in a view of FIG. 6b.

In the view of FIG. 6b, for example, the sub-module 100-d1 of the lower converter arm 11b is switched to operate as a sub-module of the upper converter arm 11a. To this end, the first and fourth power semiconductor switches 110 and 140 are turned on and the second and third power semiconductor switches 120 and 130 are turned off. As a result, the sub-module 100-d1 operates as a sub-module of the upper converter arm 11a, and the current supplied from the sub-module 100a of the upper converter arm through the first terminal X1 flows to the second terminal X2 through the first power semiconductor switch 110 and the capacitor 140. Accordingly, the current is supplied to the AC grid system as the fourth power semiconductor switch 140 is turned on.

In this case, since the redundant sub-module 100a is already operating as a sub-module of the upper converter arm 11a, the fourth power semiconductor switch 140 is turned off to shut off the current supply to the AC grid system.

In this way, the sub-module 100 according to the present invention may be applied as a sub-module comprising the upper converter arm 11a and the lower converter arm 11b, and may also be applied as a redundant sub-module connected between the upper and lower converter arms 11a and 11b. In addition, during operation of the MMC converter, the sub-module of the lower converter arm 11b may be switched to operate while operating as the sub-module of the upper converter arm 11a. The opposite case is also applicable.

As described above, according to the exemplary embodiment of the present invention, the sub-module 100 may operate the MMC converter by controlling a switching operation of turning on and turning off for the first to fourth power semiconductor switches 110 to 140 depending on a case when the sub-module operates as a sub-module constituting the upper and lower converter arms 11a and 11b and when the sub-module operates as a redundant sub-module connected between the upper and lower converter arms 11a and 11b.

As the example shown in the views of FIG. 6a and FIG. 6b, the switching operation of the first to fourth power semiconductor switches 110 to 140 varies depending on which of the upper converter arms 11a or lower converter arm 11b the sub-module 100 operates as a sub-module. Also, the flow of current varies depending on this switching operation.

In particular, in the case when the sub-module 100 operates as a sub-module of the upper converter arm 11a, when the voltage of the AC grid system is not input to the third terminal X3, the sub-module 100 operates as one of N sub-modules of the upper converter arm 11a and when the voltage of the AC grid system is input, the sub-module 100 operates as a redundant sub-module 100a of the upper converter arm 11a. In addition, in the case when the sub-module 100 operates as a sub-module of the lower converter arm 11b, when the voltage of the AC grid system is not input to the third terminal X3, the sub-module 100 operates as one of N sub-modules of the lower converter arm 11b and when the voltage of the AC grid system is input, the sub-module 100 operates as a redundant sub-module 100a of the lower converter arm 11b.

Thus, according to the present invention, depending on whether the sub-module 100 operates as a sub-module of the upper and lower converter arms 11a and 11b or as a redundant sub-module, the input of the voltage of the AC system and the switching behavior of the first to fourth power semiconductor switches 110 to 140 may vary. The switching operation for each state is shown in Table 1 below.

TABLE 1

| Type | AC voltage | Capacitor voltage | First power semi-conductor switch | Second power semi-conductor switch | Third power semi-conductor switch | Fourth power semi-conductor switch |
|---|---|---|---|---|---|---|
| Upper Converter arm | Input | Vc | ON | OFF | OFF | ON |
|  |  | 0 (bypass) | OFF | ON | OFF | ON |
|  | No input | Vc | ON | OFF | OFF | OFF |
|  |  | 0 (bypass) | OFF | ON | OFF | OFF |
| Lower Converter arm | Input | Vc | ON | OFF | ON | OFF |
|  |  | 0 (bypass) | OFF | ON | ON | OFF |
|  | No input | Vc | ON | OFF | OFF | OFF |
| Lower Converter arm |  | 0 (bypass) | OFF | ON | OFF | OFF |

That is, according to the embodiment of the present invention as shown in Table 1, when the sub-module 100 operates as one of the N sub-modules constituting the upper converter arm 11a, no voltage is input to the AC grid system. In this case, the first power semiconductor switch 110 is turned on and the second to fourth power semiconductor switches 120 to 140 are turned off to charge the capacitor 150 with the Vc voltage. Also, when bypassing the current without charging the capacitor 150, the second power semiconductor switch 120 is turned on and the first, third and fourth power semiconductor switches 110, 130, and 140 are turned off.

In addition, according to the embodiment of the present invention as shown in Table 1, when the sub-module 100 operates as one of the N sub-modules as the redundant sub-module 100a due to a failure in one of the N sub-modules constituting the upper converter arm 11a, voltage is input to the AC grid system. In this case, the first and fourth power semiconductor switches 110 and 140 are turned on and the second and third power semiconductor switches 120 and 130 are turned off to charge the capacitor 150 with the Vc voltage. Also, when the current is bypassed without charging the capacitor 150, the second and fourth power semiconductor switches 120 and 140 are turned on and the first and third power semiconductor switches 110 and 130 are turned off.

In addition, even when the sub-module 100 is applied to the N sub-modules and the redundant sub-modules constituting the lower converter arm 11b, as shown in Table 1, the first to fourth power semiconductor switches 110 to 140 are turned on or turned off.

Figures 7A, 7B:
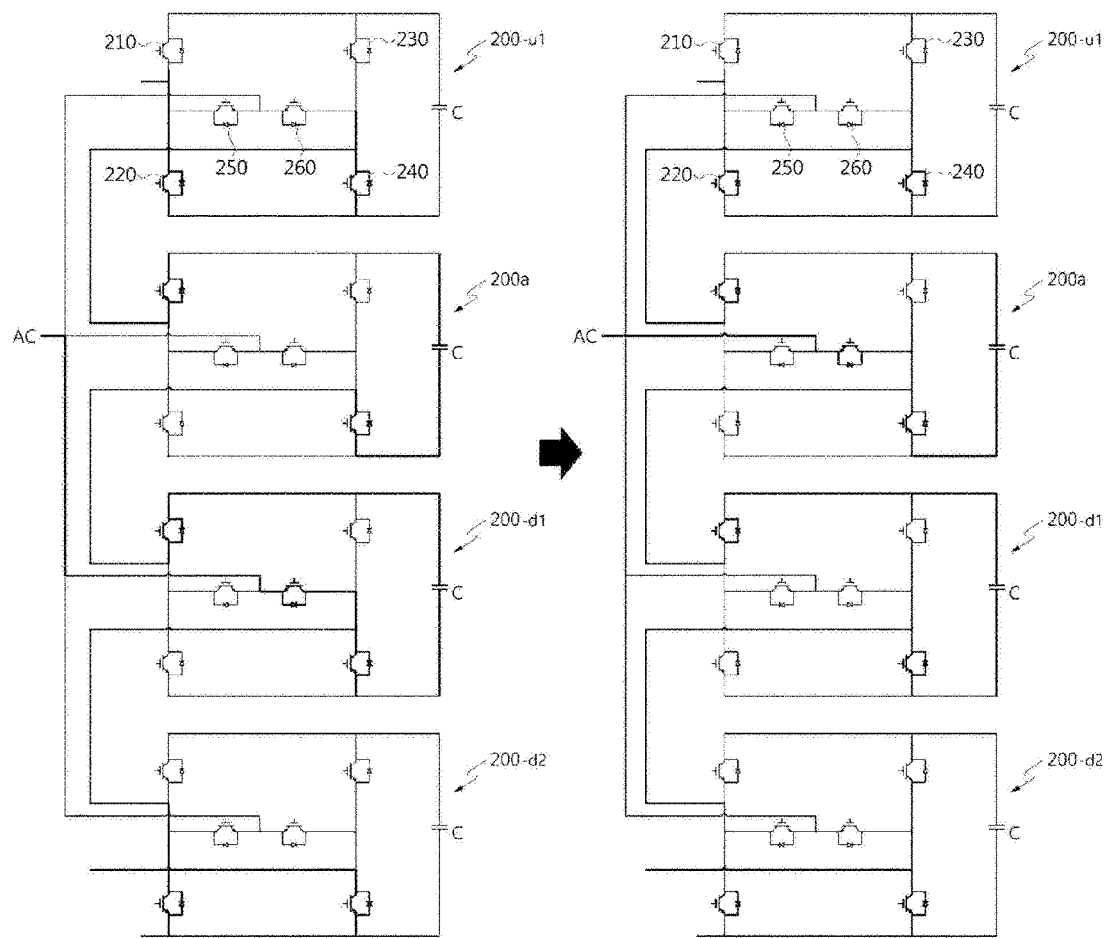
FIG. 7a and FIG. 7b are operation diagrams illustrating an example of the MMC converter to which the sub-module of FIG. 4 is applied.

FIG. 7a and FIG. 7b are operation diagrams illustrating an example of the MMC converter to which the sub-module of FIG. 4 is applied.

In FIG. 7a and FIG. 7b, for example, the sub-modules 200-u1 and the lower converter arm 11b of the upper converter arm 11a are provided with the sub-modules 200-d1 and 200-d2, and the current flow is illustrated according to the operation in the MMC converter to which the redundant sub-module 200a is connected between the upper and lower converter arms 11a and 11b.

First, in a view of FIG. 7a, an example is illustrated in which a sub-module 200-u1 having a failure is replaced with each of the redundant sub-module 200a when the current is bypassed due to a failure in the sub-module 200-u1 of the upper converter arm 11a during each of the sub-modules 200-u1, 200-d1, and 200-d2 is in normal operation in the upper converter arm 11a and the lower converter arm 11b.

Like this, the failed sub-module 200-u 1 turns on the second and fourth power semiconductor switch 220 and 240 and turns off the first, third, fifth, and sixth power semiconductor switches 110, 130, 150, and 160 to bypass the current, so that the current supplied from the upper sub-module (not shown) through the first terminal X1 is to flow to the second terminal X2 through the second power semiconductor switch 220 and the fourth power semiconductor switch 240 so as to supply the current to the lower sub-module 200-dl.

The redundant sub-module 200a replaces the failed sub-module 200-u 1, and for this purpose, the first, fourth, and sixth power semiconductor switches 210, 240, and 260 are turned on and the second, third, and fifth power semiconductor switches 220, 230, and 250 are turned off. As a result, the redundant sub-module 200a operates as a sub-module of the upper converter arm 11a, and the current bypassed from the sub-module 200-u1 having a failure as described above is supplied through the first terminal X1. Accordingly, the current flows to the second terminal X2 through the first power semiconductor switch 210, the capacitor 270, and the fourth power semiconductor switch 240, and at the same time, the current flows through the sixth power semiconductor switch 260 to the third terminal X3 to supply the current to the AC grid system.

The redundant sub-module 200a may be input by substituting the failed sub-module in the same principle as described above, depending on the number of redundant sub-modules 200a provided.

Here, as shown in the diagram, when additional failure occurs in another sub-module of the upper converter arm 11a while all the redundant sub-modules 200a are input, any one of the plurality of sub-modules constituting the lower converter arm 11b may be operated as a sub-module of the upper converter arm 11a as shown in a view of FIG. 7b.

In the view B of FIG. 7 of FIG. 7b, for example, the sub-module 100-d1 of the lower converter arm 11 b is switched to operate as a sub-module of the upper converter arm 11a. To this end, the first, fourth, and sixth power semiconductor switches 210, 240, and 260 are turned on and the second, third, and fifth power semiconductor switches 220, 230, and 250 are turned off. As a result, the redundant sub-module 200a operates as a sub-module of the upper converter arm 11a, and the current bypassed from the sub-module 200-u2 having a failure as described above is supplied through the first terminal X2. Accordingly, the current flows to the second terminal X2 through the first power semiconductor switch 210, the capacitor 270, and the fourth power semiconductor switch 240, and at the same time, the current flows through the sixth power semiconductor switch 260 to the third terminal X3 to supply the current to the AC grid system.

In this case, since the redundant sub-module 200a is already operating as a sub-module of the upper converter arm 11a, the sixth power semiconductor switch 260 is turned off to shut off the current supply to the AC grid system.

In this way, the sub-module 200 according to the present invention may be applied as a sub-module comprising the upper converter arm 11a and the lower converter arm 11b, and may also be applied as a redundant sub-module connected between the upper and lower converter arms 11a and 11b. In addition, during operation of the MMC converter, the sub-module of the lower converter arm 11b may be switched to operate while operating as the sub-module of the upper converter arm 11a. The opposite case is also applicable.

As described above, according to the exemplary embodiment of the present invention, the sub-module 200 may operate the MMC converter by controlling a switching operation of turning on or turning off for the first to sixth power semiconductor switches 210 to 260 according to a case when the sub-module operates as a sub-module constituting the upper and lower converter arms 11a and 11b or when the sub-module operates as a redundant sub-module connected between the upper and lower converter arms 11a and 11b.

As the example shown in the views of FIG. 7a and FIG. 7b, the switching operation of the first to sixth power semiconductor switches 210 to 260 varies depending on which of the upper converter arms 11a or lower converter arm 11b the sub-module 100 operates as a sub-module. Also, the flow of current varies depending on this switching operation.

In particular, when the sub-module 200 operates as a sub-module of the upper converter arm 11a, when the voltage of the AC grid system is not input to the third terminal X3, the sub-module 200 operates as one of N sub-modules of the upper converter arm 11a and when the voltage of the AC grid system is input, the sub-module 200 operates as a redundant sub-module 200a of the upper converter arm 11a. In addition, when the sub-module 200 operates as a sub-module of the lower converter arm 11b, when the voltage of the AC grid system is not input to the third terminal X3, the sub-module 200 operates as one of N sub-modules of the lower converter arm 11b and when the voltage of the AC grid system is input, the sub-module 200 operates as a redundant sub-module 200a of the lower converter arm 11b.

Thus according to the present invention, depending on whether the sub-module 200 operates as a sub-module of the upper and lower converter arms 11a and 11b or as a redundant sub-module, the input of the voltage of the AC system and the switching behavior of the first to sixth power semiconductor switches 210 to 260 may vary. The switching operation for each state is shown in Table 2 below.

TABLE 2

| Type | | AC Voltage | Capacitor Voltage | First Power semi-conductor switch | Second Power semi-conductor switch | Third Power semi-conductor switch | Fourth Power semi-conductor switch | Fifth Power semi-conductor switch | Sixth Power semi-conductor switch |
|---|---|---|---|---|---|---|---|---|---|
| Upper Converter arm | Input | | Vc | ON | OFF | OFF | ON | OFF | ON |
| | | | 0 (bypass) | ON | OFF | ON | OFF | OFF | ON |
| | | | | OFF | ON | ON | ON | OFF | ON |
| | | | −Vc | OFF | ON | ON | OFF | OFF | ON |
| | No input | | Vc | ON | OFF | OFF | ON | OFF | OFF |
| | | | 0 (bypass) | ON | OFF | ON | OFF | OFF | OFF |
| | | | | OFF | ON | ON | ON | OFF | OFF |
| | | | −Vc | OFF | ON | ON | OFF | OFF | OFF |
| Lower Converter arm | Input | | Vc | ON | OFF | OFF | ON | ON | OFF |
| | | | 0 (bypass) | ON | OFF | ON | OFF | ON | OFF |
| | | | | OFF | ON | ON | ON | ON | OFF |
| | | | −Vc | OFF | ON | ON | OFF | ON | OFF |
| | No input | | Vc | ON | OFF | OFF | ON | OFF | OFF |
| | | | 0 (bypass) | ON | OFF | ON | OFF | OFF | OFF |
| | | | | OFF | ON | ON | ON | OFF | OFF |
| | No input | | −Vc | OFF | ON | ON | OFF | OFF | OFF |

That is, according to the embodiment of the present invention as shown in Table 2, when the sub-module 200 operates as one of the N sub-modules constituting the upper converter arm 11a, no voltage is input to the AC grid system. In this case, the first and fourth power semiconductor switches 210 and 240 are turned on and the second, third, fifth, and sixth power semiconductor switches 220, 230, 250, and 260 are turned off to charge the capacitor 270 with the +Vc voltage. Also, when bypassing the current without charging the capacitor 150, the first and third power semiconductor switches 210 and 230 are turned on. Alternatively, and the second, fourth, fifth, and sixth power semiconductor switches 220, 240, 250, and 260 are turned off. Alternatively, the first, second, and third power semiconductor switches 210, 220, and 230 are turned on, and the fourth, fifth, and sixth power semiconductor switches 240, 250, and 260 are turned on. Meanwhile, when the capacitor 270 is charged with the voltage—Vc, the second, third and sixth power semiconductors 220, 230 and 260 are turned on and the first, fourth, and fifth power semiconductor switches 210, 240 and 250 are turned off.

In addition, according to the embodiment of the present invention as shown in Table 2, when the sub-module 200 operates as one of the N sub-modules as the redundant sub-module 200a due to a failure in one of the N sub-modules constituting the upper converter arm 11a, voltage is input to the AC grid system. In this case, the first, fourth, and sixth power semiconductor switches 210, 240, and 260 are turned on and the second, third, and fifth power semiconductor switches 220, 230, and 250 are turned off to charge the capacitor 270 with the +Vc voltage. Also, when the current is bypassed without charging the capacitor 270, the first, third, and sixth power semiconductor switches 210, 230, and 260 are turned on and the other second, fourth, fifth power semiconductor switches 220, 240, 250 are turn off. Alternatively, the second, third, and fourth power semiconductor switches 220, 230, and 240 are turned on, and the first, fifth, and sixth power semiconductor switches 210, 250, and 260 are turned off. Meanwhile, when the capacitor 270 is charged with the voltage—Vc voltage, the second, third, and sixth power semiconductor switches 220, 230, and 260 are turned on, and the other first, fourth, and fifth power semiconductor switches 210, 240, and 250 are turned off.

In addition, even when the sub-module 200 is applied to the N sub-modules and the redundant sub-modules constituting the lower converter arm 11b, as shown in Table 2, the first to sixth power semiconductor switches 210 to 260 are turned on or turned off.

As described above, the sub-modules 100 and 200 according to the present invention may be applied to the MMC converter, and in particular, may be applied as a redundant sub-module in the MMC converter. In addition, the sub-modules 100 and 200 according to the present invention have a first terminal X1 and a second terminal X2 for connecting in series with other sub-modules and a third terminal X3 for connecting with an AC grid system, respectively. In this case, the switching operation of the sub-module and the redundant sub-module in the MMC converter varies according to whether the AC voltage is input through the third terminal X3, and the switching operation varies according to the charging of the capacitor or the bypass of the current.

Therefore, by applying the sub-modules 100 and 200 according to the present invention to the MMC converter and by appropriately controlling the switching operations of the plurality of power semiconductor switches constituting such a sub-module, it is efficient in the MMC converter operation and effective in the cost saving.

In the description above, although all the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. In addition, the terms "comprise", "include", or "have" described above mean that the corresponding component may be inherent unless otherwise stated, and thus it should be construed that it may further include other components, not to exclude other components. That is, terms like "include", "comprise", and "have" should be interpreted in default as inclusive or open rather than exclusive or closed unless expressly defined to the contrary. In the flowing description, unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although exemplary aspects of the present disclosure have been described for illustrative purposes, those skilled in the art will appreciate that various modifications, additions and substitutions are possible, without departing from essential characteristics of the disclosure. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following s, and all technical ideas within the scope equivalent thereto should be construed as being included in the scope of the present invention.

The invention claimed is:

1. A sub-module of a modular multilevel converter (MMC), the sub-module comprising:
   a first power semiconductor switch and a second power semiconductor switch connected in series in a same direction, each comprising a semiconductor switch and a diode connected in anti-parallel to the respective semiconductor switch;
   a capacitor connected in parallel to the first power semiconductor switch and the second power semiconductor switch connected in series;
   a first terminal connected to a first node between the first and second power semiconductor switches;
   a second terminal connected to a second node between the second power semiconductor switch and the capacitor;
   a third power semiconductor switch and a fourth power semiconductor switch connected in series in opposite directions, each including a semiconductor switch and a diode connected in anti-parallel to the respective semiconductor switch; and
   a third terminal connected to a third node between the third and fourth power semiconductor switches,
   wherein a cathode of the diode provided in the third power semiconductor switch is connected to the first node, and a cathode of the diode provided in the fourth power semiconductor switch is connected to the second.

2. The sub-module of claim 1, wherein the first terminal is connected to one of two terminals of a second sub-module connected to an upper end of a redundant sub-module and the second terminal is connected to one of two terminals of a third sub-module connected to a lower end of the redundant sub-module.

3. The sub-module of claim 2, wherein the third terminal is connected to a terminal of an AC grid system.

4. A sub-module of a modular multilevel converter (MMC), the sub-module comprising:
   a first power semiconductor switch and a second power semiconductor switch connected in series in a same direction, each comprising a semiconductor switch and a diode connected in anti-parallel to the respective semiconductor switch;
   a third power semiconductor switch and a fourth power semiconductor switch connected in series in a same direction, each comprising a semiconductor switch and a diode connected in anti-parallel to the respective semiconductor switch;
   a capacitor connected in parallel to the first power semiconductor switch and the second power semiconductor switch connected in series and to the third power semiconductor switch and the fourth power semiconductor switch connected in series;
   a first terminal connected to a first node between the first and second power semiconductor switches;
   a second terminal connected to a second node between the third and fourth power semiconductor switches;
   a fifth power semiconductor switch and a sixth power semiconductor switch connected in series in opposite directions between the first and second nodes, each including a semiconductor switch and a diode connected in anti-parallel to the respective semiconductor switch; and
   a third terminal connected to a third node between the fifth and sixth power semiconductor switches, wherein a cathode of the diode provided in the fifth power semiconductor switch is connected to the first node, and a cathode of the diode provided in the sixth power semiconductor switch is connected to the second node.

5. The sub-module of claim 4, wherein the first terminal is connected to one of two terminals of a second sub-module connected to an upper end of a redundant sub-module and the second terminal is connected to one of two terminals of a third sub-module connected to a lower end of the redundant sub-module.

6. A redundant sub-module of a modular multilevel converter (MMC), the redundant sub-module comprising:
a first power semiconductor switch and a second power semiconductor switch connected in series in a same direction, each comprising a semiconductor switch and a diode connected in anti-parallel to the respective semiconductor switch;
a capacitor connected in parallel to the first power semiconductor switch and the second power semiconductor switch connected in series;
a first terminal connected to a first node between the first and second power semiconductor switches;
a second terminal connected to a second node between the second power semiconductor switch and the capacitor;
a third power semiconductor switch and a fourth power semiconductor switch connected in series in opposite directions, each including a semiconductor switch and a diode connected in anti-parallel to the respective semiconductor switch; and
a third terminal connected to a third node between the third and fourth power semiconductor switches, wherein the redundant sub-module is connected between an upper converter arm and a lower converter arm composed of a plurality of sub-modules connected in series to each other and is configured to be connected to the upper converter arm and the lower converter arm constituting the MMC such that the redundant sub-module operates by replacing a sub-module in which a failure occurs among the plurality of sub-modules constituting the upper converter arm or the lower converter arm.

7. The redundant sub-module of claim 6, wherein a cathode of the diode provided in the third power semiconductor switch is connected to the first node, and a cathode of the diode provided in the fourth power semiconductor switch is connected to the second node.

8. The redundant sub-module of claim 6, wherein the first terminal is connected to one of two terminals of a first sub-module connected to an upper end of the redundant sub-module and the second terminal is connected to one of two terminals of a second sub-module connected to a lower end of the redundant sub-module.

9. The redundant sub-module of claim 8, wherein the third terminal is connected to a terminal of an AC grid system.

10. A redundant sub-module of a modular multilevel converter (MMC), comprising:
a first power semiconductor switch and a second power semiconductor switch connected in series in a same direction, each comprising a semiconductor switch and a diode connected in anti-parallel to the respective semiconductor switch;
a third power semiconductor switch and a fourth power semiconductor switch connected in series in a same direction, each comprising a semiconductor switch and a diode connected in anti-parallel to the respective semiconductor switch;
a capacitor connected in parallel to the first power semiconductor switch and the second power semiconductor switch connected in series and to the third power semiconductor switch and the fourth power semiconductor switch connected in series;
a first terminal connected to a first node between the first and second power semiconductor switches;
a second terminal connected to a second node between the third and fourth power semiconductor switches;
a fifth power semiconductor switch and a sixth power semiconductor switch connected in series in opposite directions between the first and second nodes, each including a semiconductor switch and a diode connected in anti-parallel to the respective semiconductor switch; and
a third terminal connected to a third node between the fifth and sixth power semiconductor switches, wherein the redundant sub-module is connected between an upper converter arm and a lower converter arm composed of a plurality of sub-modules connected in series to each other and is configured to be connected to the upper converter arm and the lower converter arm constituting the MMC such that the redundant sub-module operates by replacing a sub-module in which a failure occurs among the plurality of sub-modules constituting the upper converter arm or the lower converter arm.

11. The redundant sub-module of claim 10, wherein a cathode of the diode provided in the fifth power semiconductor switch is connected to the first node, and a cathode of the diode provided in the sixth power semiconductor switch is connected to the second node.

12. The redundant sub-module of claim 10, wherein the first terminal is connected to one of two terminals of a first sub-module connected to an upper end of the redundant sub-module and the second terminal is connected to one of two terminals of a second sub-module connected to a lower end of the redundant sub-module.

13. A modular multilevel converter (MMC), comprising:
an upper converter arm composed of a first plurality of sub-modules connected in series to each other; and
a lower converter arm composed of a second plurality of sub-modules connected in series to each other and connected in series to a sub-module of the upper converter arm, wherein each of the first and second plurality of sub-modules comprises:
a first power semiconductor switch and a second power semiconductor switch connected in series in a same direction, each including a semiconductor switch and a diode connected in anti-parallel to the respective semiconductor switch;
a capacitor connected in parallel to the first power semiconductor switch and the second power semiconductor switch connected in series;
a first terminal connected to a first node between the first and second power semiconductor switches;
a second terminal connected to a second node between the second power semiconductor switch and the capacitor;
a third power semiconductor switch and a fourth power semiconductor switch connected in series in opposite directions between the first terminal and the second terminal, each including a semiconductor switch and a diode connected in anti-parallel to the respective semiconductor switch; and
a third terminal connected to a third node between the third and fourth power semiconductor switches.

14. The MMC of claim 13, wherein a cathode of the diode provided in the third power semiconductor switch is connected to the first node, and a cathode of the diode provided in the fourth power semiconductor switch is connected to the second node.

15. The MMC of claim 13, wherein the first terminal is connected to one of two terminals of a second sub-module connected to an upper end of a redundant sub-module and the second terminal is connected to one of two terminals of a third sub-module connected to a lower end of the redundant sub-module.

16. The MMC of claim 15, wherein the third terminal is connected to a terminal of an AC grid system.

17. A modular multilevel converter (MMC), comprising:
an upper converter arm composed of a first plurality of sub-modules connected in series to each other; and
a lower converter arm composed of a second plurality of sub-modules connected in series to each other and connected in series to a sub-module of the upper converter arm, wherein each of the first and second plurality of sub-modules comprises:
a first power semiconductor switch and a second power semiconductor switch connected in series in a same direction, each including a semiconductor switch and a diode connected in anti-parallel to the respective semiconductor switch;
a third power semiconductor switch and a fourth power semiconductor switch connected in series in a same direction, each including a semiconductor switch and a diode connected in anti-parallel to the respective semiconductor switch;
a capacitor connected in parallel to the first and second power semiconductor switches connected in series and to the third and fourth power semiconductor switches connected in series;
a first terminal connected to a first node between the first and second power semiconductor switches;
a second terminal connected to a second node between the third and fourth power semiconductor switches;
a fifth power semiconductor switch and a sixth power semiconductor switch connected in series in opposite directions between the first and second nodes, each including a semiconductor switch and a diode connected in anti-parallel to the respective semiconductor switch; and
a third terminal connected to a third node between the fifth and sixth power semiconductor switches.

18. The MMC of claim 17, wherein a cathode of the diode provided in the fifth power semiconductor switch is connected to the first node, and a cathode of the diode provided in the sixth power semiconductor switch is connected to the second node.

19. The MMC of claim 17, wherein the first terminal is connected to one of two terminals of a second sub-module connected to an upper end of a redundant sub-module and the second terminal is connected to one of two terminals of a third sub-module connected to a lower end of the redundant sub-module.

20. A modular multilevel converter (MMC), comprising:
an upper converter arm composed of a first plurality of sub-modules connected in series to each other;
a lower converter arm composed of a second plurality of sub-modules connected in series to each other; and
at least one redundant sub-module connected in series between the upper and lower converter arms and configured to be connected to the upper and lower converter arms, wherein the redundant sub-module comprises:
a first power semiconductor switch and a second power semiconductor switch connected in series in a same direction, each including a semiconductor switch and a diode connected in anti-parallel to the respective semiconductor switch;
a capacitor connected in parallel to the first power semiconductor switch and the second power semiconductor switch connected in series;
a first terminal connected to a first node between the first and second power semiconductor switches;
a second terminal connected to a second node between the second power semiconductor switch and the capacitor;
a third power semiconductor switch and a fourth power semiconductor switch connected in series in opposite directions between the first terminal and the second terminal, each including a semiconductor switch and a diode connected in anti-parallel to the respective semiconductor switch; and
a third terminal connected to a third node between the third and fourth power semiconductor switches.

21. The MMC of claim 20, wherein a cathode of the diode provided in the third power semiconductor switch is connected to the first node, and a cathode of the diode provided in the fourth power semiconductor switch is connected to the second node.

22. The MMC of claim 20, wherein the first terminal is connected to one of two terminals of a first sub-module connected to an upper end of the redundant sub-module and the second terminal is connected to one of two terminals of a second sub-module connected to a lower end of the redundant sub-module.

23. The MMC of claim 22, wherein the third terminal is connected to a terminal of an AC grid system.

24. A modular multilevel converter (MMC), comprising:
an upper converter arm composed of a first plurality of sub-modules connected in series to each other;
a lower converter arm composed of a second plurality of sub-modules connected in series to each other; and
at least one redundant sub-module connected in series between the upper and lower converter arms and configured to be connected to the upper and lower converter arms, wherein the redundant sub-module comprises:
a first power semiconductor switch and a second power semiconductor switch connected in series in a same direction, each including a semiconductor switch and a diode connected in anti-parallel to the respective semiconductor switch;
a third power semiconductor switch and a fourth power semiconductor switch connected in series in a same direction, each including a semiconductor switch and a diode connected in anti-parallel to the respective semiconductor switch;
a capacitor connected in parallel to the first and second power semiconductor switches connected in series and to the third and fourth power semiconductor switches connected in series;
a first terminal connected to a first node between the first and second power semiconductor switches;
a second terminal connected to a second node between the third and fourth power semiconductor switches;
a fifth power semiconductor switch and a sixth power semiconductor switch connected in series in opposite directions between the first and second nodes, each including a semiconductor switch and a diode connected in anti-parallel to the respective semiconductor switch; and a third terminal connected to a third node between the fifth and sixth power semiconductor switches.

25. The MMC of claim 24, wherein a cathode of the diode provided in the fifth power semiconductor switch is connected to the first node, and a cathode of the diode provided in the sixth power semiconductor switch is connected to the second node.

26. The MMC of claim 24, wherein the first terminal is connected to one of two terminals of a first sub-module connected to an upper end of the redundant sub-module and the second terminal is connected to one of two terminals of a second sub-module connected to a lower end of the redundant sub-module.

* * * * *